(12) United States Patent
Rublee

(10) Patent No.: US 10,059,006 B2
(45) Date of Patent: Aug. 28, 2018

(54) METHODS AND SYSTEMS FOR PROVIDING LANDMARKS TO FACILITATE ROBOT LOCALIZATION AND VISUAL ODOMETRY

(71) Applicant: X Development LLC, Mountain View, CA (US)

(72) Inventor: Ethan Rublee, Mountain View, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/226,353

(22) Filed: Aug. 2, 2016

(65) Prior Publication Data
US 2016/0339587 A1    Nov. 24, 2016

Related U.S. Application Data

(63) Continuation of application No. 14/541,576, filed on Nov. 14, 2014, now Pat. No. 9,427,874.
(Continued)

(51) Int. Cl.
*G05D 1/02*      (2006.01)
*B25J 9/16*      (2006.01)
(Continued)

(52) U.S. Cl.
CPC ......... *B25J 9/1697* (2013.01); *B05B 13/0431* (2013.01); *B25J 11/0075* (2013.01); *B25J 13/089* (2013.01); *B25J 19/021* (2013.01); *B65G 59/02* (2013.01); *B05B 12/122* (2013.01); *B65G 61/00* (2013.01);
(Continued)

(58) Field of Classification Search
CPC .......... G06F 19/18; G06F 19/24; G06F 19/20; G06F 19/22; G06F 17/30542; G06F 19/10; G06F 19/12; G06F 19/34; G06F 19/3443; G06F 19/14; G06F 19/345; G06F 3/0346; E01C 23/01; E01C 23/163; G01C 15/00; G01S 19/14; G01S 11/12; G01S 19/48; G01S 5/16; G01S 5/163; B25J 11/00; B65D 51/24; B65G 47/28; B05B 13/0431
See application file for complete search history.

(56) References Cited

U.S. PATENT DOCUMENTS

| | | |
|---|---|---|
| 5,163,101 A | 11/1992 | Deering |
| 5,525,883 A | 6/1996 | Avitzour |

(Continued)

*Primary Examiner* — Ryan Rink
(74) *Attorney, Agent, or Firm* — McDonnell Boehnen Hulbert & Berghoff LLP

(57) ABSTRACT

Methods and systems for providing landmarks to facilitate robot localization and visual odometry are provided herein. At least one area of a physical environment in which a robotic device resides may be determined to include surfaces that lack sufficient discernable features to determine a location of the at least one area. Instructions may responsively be provided to the robotic device for the robotic device to provide a material in respective patterns onto one or more surfaces of the at least one area. Instructions can responsively be provided for the robotic device to provide the material in respective textures as well. The respective patterns or textures may include sufficient discernable features to determine a location of the at least one area, and the material may remain on the one or more surfaces for a predetermined period of time.

20 Claims, 9 Drawing Sheets

Related U.S. Application Data

(60) Provisional application No. 62/041,338, filed on Aug. 25, 2014.

(51) Int. Cl.

| | | |
|---|---|---|
| *B25J 19/02* | (2006.01) | |
| *B65G 59/02* | (2006.01) | |
| *B05B 13/04* | (2006.01) | |
| *B25J 13/08* | (2006.01) | |
| *B25J 11/00* | (2006.01) | |
| *B05B 12/12* | (2006.01) | |
| *B65G 61/00* | (2006.01) | |

(52) U.S. Cl.
CPC ....... *B65G 2203/041* (2013.01); *Y10S 901/01* (2013.01); *Y10S 901/43* (2013.01); *Y10S 901/47* (2013.01)

(56) References Cited

U.S. PATENT DOCUMENTS

| | | | |
|---|---|---|---|
| 6,941,199 B1 | 9/2005 | Bottomley et al. | |
| 7,725,232 B2* | 5/2010 | Makela | G01C 21/12 180/317 |
| 7,974,738 B2 | 7/2011 | Bruemmer et al. | |
| 9,792,581 B1* | 10/2017 | Mendola | G06Q 10/087 |
| 2003/0052529 A1 | 3/2003 | Hakkinen | |
| 2006/0221403 A1* | 10/2006 | Bancel | B41J 3/36 358/3.24 |
| 2007/0100496 A1 | 5/2007 | Forell | |
| 2007/0260394 A1 | 11/2007 | Dean | |
| 2007/0276558 A1 | 11/2007 | Kim | |
| 2008/0009970 A1 | 1/2008 | Bruemmer | |
| 2008/0077511 A1 | 3/2008 | Zimmerman | |
| 2009/0105950 A1 | 4/2009 | Arteaga et al. | |
| 2010/0134290 A1* | 6/2010 | Reynolds | B82Y 25/00 340/572.1 |
| 2011/0086166 A1 | 4/2011 | Fischer et al. | |
| 2011/0196563 A1 | 8/2011 | Yturralde et al. | |
| 2012/0191272 A1* | 7/2012 | Andersen | G06Q 10/087 701/2 |
| 2012/0239191 A1 | 9/2012 | Versteeg et al. | |
| 2013/0190981 A1 | 7/2013 | Dolinar et al. | |
| 2014/0342834 A1* | 11/2014 | Tappeiner | A63H 30/04 463/42 |
| 2015/0094836 A1 | 4/2015 | Rivers et al. | |
| 2015/0109338 A1 | 4/2015 | McKinnon et al. | |
| 2015/0148949 A1 | 5/2015 | Chin et al. | |
| 2015/0332206 A1* | 11/2015 | Trew | G06Q 10/083 705/330 |
| 2016/0129593 A1* | 5/2016 | Wolowelsky | B25J 5/00 700/253 |
| 2018/0039277 A1* | 2/2018 | Liu | G05D 1/0253 |

* cited by examiner

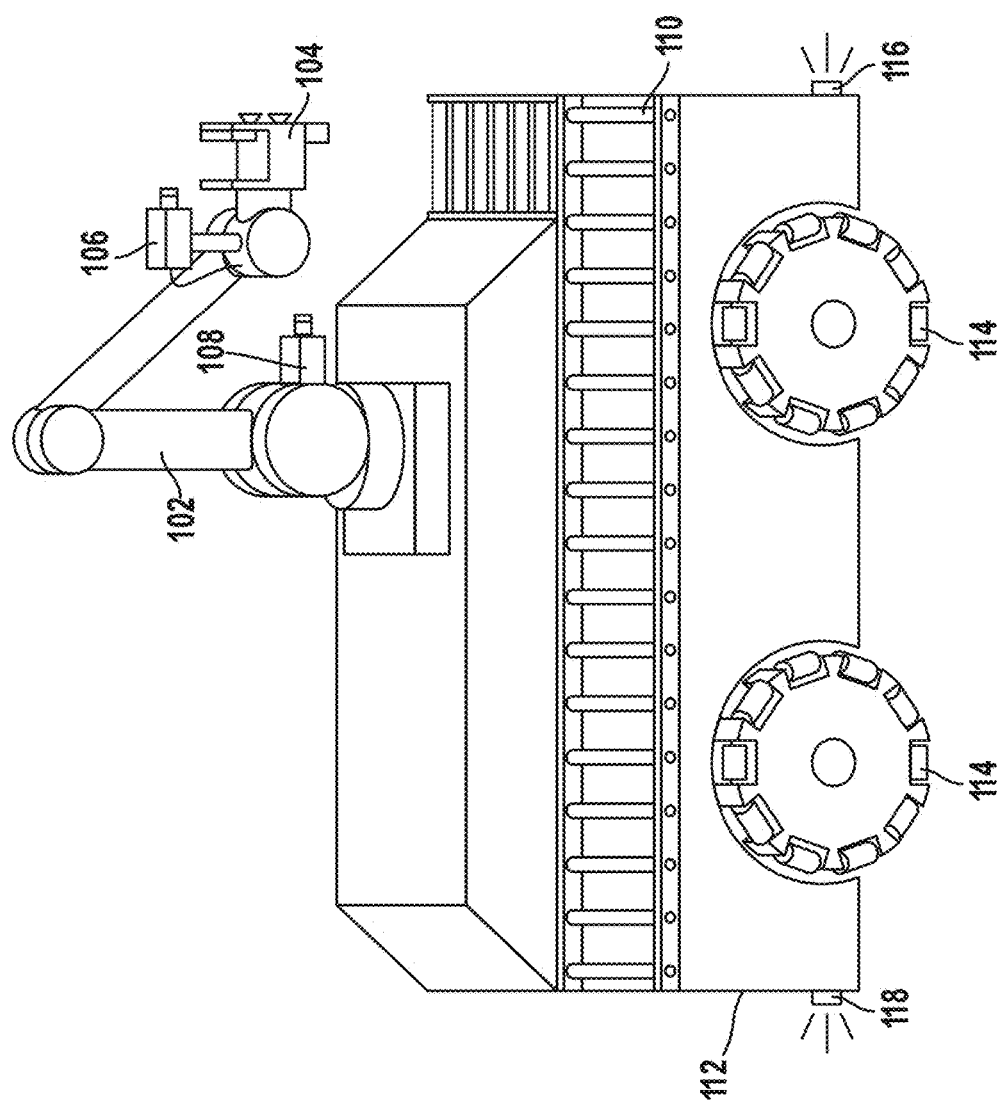

METHODS AND SYSTEMS FOR PROVIDING LANDMARKS TO FACILITATE ROBOT LOCALIZATION AND VISUAL ODOMETRY

CROSS-REFERENCE TO RELATED APPLICATION

The present disclosure is a continuation of U.S. patent application Ser. No. 14/541,576, filed on Nov. 14, 2014, and entitled "Methods and Systems for Providing Landmarks to Facilitate Robot Localization and Visual Odometry," which claims priority to U.S. Provisional Application No. 62/041,338, filed on Aug. 25, 2014, the entire contents of which are herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as autonomous robotic devices, that occupy a physical environment may need to periodically or continuously determine their location in the environment in order to perform certain actions. To facilitate this, when placed in an environment that is at least partially unknown to the robotic devices, the robotic devices may acquire visual information about the environment and use that information to construct a map of the environment and to determine their location (i.e., localize the robotic devices in the environment). The robotic devices may then plan to navigate through and perform actions in the environment. In addition to using visual information for performing mapping and localization, robotic devices may also use the visual information for determining changes in a robotic device's position and orientation through a process called visual odometry.

The visual information acquired by the robotic devices may include images of landmarks that are present in the environment and recognizable by the robotic devices. These landmarks may often take the form of unique objects or features that are substantially static in the environment so that the robotic devices may more easily detect the landmarks.

SUMMARY

The present application discloses implementations that relate to providing landmarks to facilitate localization and visual odometry by a robotic device or computing system associated with a robotic device. In one aspect, the present application describes a method. The method may involve determining, by a computing device, that at least one area of a physical environment in which a robotic device resides includes one or more surfaces that lack sufficient discernable features to determine a location of the at least one area in the physical environment. The method may also involve, in response to the determining, providing instructions to the robotic device to provide a material in respective patterns onto the one or more surfaces of the at least one area, where the respective patterns include sufficient discernable features to determine a location of the at least one area in the physical environment, and where the material remains on the one or more surfaces for a predetermined period of time.

In another aspect, the present application describes a system. The system may include a robotic device, one or more optical sensors, at least one processor, and data storage comprising instructions executable by the at least one processor to cause the system to perform operations. The operations may include receiving an indication of a type of material that was previously provided onto one or more surfaces in a physical environment in which the robotic device resides and is predicted to remain on the one or more surfaces for a predetermined period of time. The operations may also include, based on the indication, detecting, using the one or more optical sensors, respective patterns of the type of material on at least one surface of the one or more surfaces. The operations may further include determining discernable features from the detected respective patterns on the at least one surface. The operations may still further include, based on the determined discernable features, determining a location of the at least one surface with respect to a location of the robotic device in the physical environment.

In still another aspect, the present application describes a system. The system may include a robotic device, an applicator configured to provide a material that is at least partially liquid onto objects and remains on the objects for a predetermined period of time, one or more optical sensors, at least one processor, and data storage comprising instructions executable by the at least one processor to cause the system to perform operations. The operations may include determining, based on data received from the one or more optical sensors, that at least one area of a physical environment in which the robotic device resides includes one or more surfaces that lack sufficient discernable features to determine a location of the at least one area in the physical environment. The operations may also include, in response to the determining, providing instructions to the robotic device to provide, using the applicator, the material in respective patterns onto the one or more surfaces of the at least one area, where the respective patterns include sufficient discernable features to determine a location of the at least one area in the physical environment.

In yet another aspect, a system is provided that includes a means for determining, that at least one area of a physical environment in which a robotic device resides includes one or more surfaces that lack sufficient discernable features to determine a location of the at least one area in the physical environment. The system may also include a means for, in response to the determining, providing instructions to the robotic device to provide a material in respective patterns onto the one or more surfaces of the at least one area, where the respective patterns include sufficient discernable features to determine a location of the at least one area in the physical environment, and where the material remains on the one or more surfaces for a predetermined period of time.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 1A shows a robotic arm mounted on a moveable cart, according to an example implementation.

DETAILED DESCRIPTION

Figure 1B:
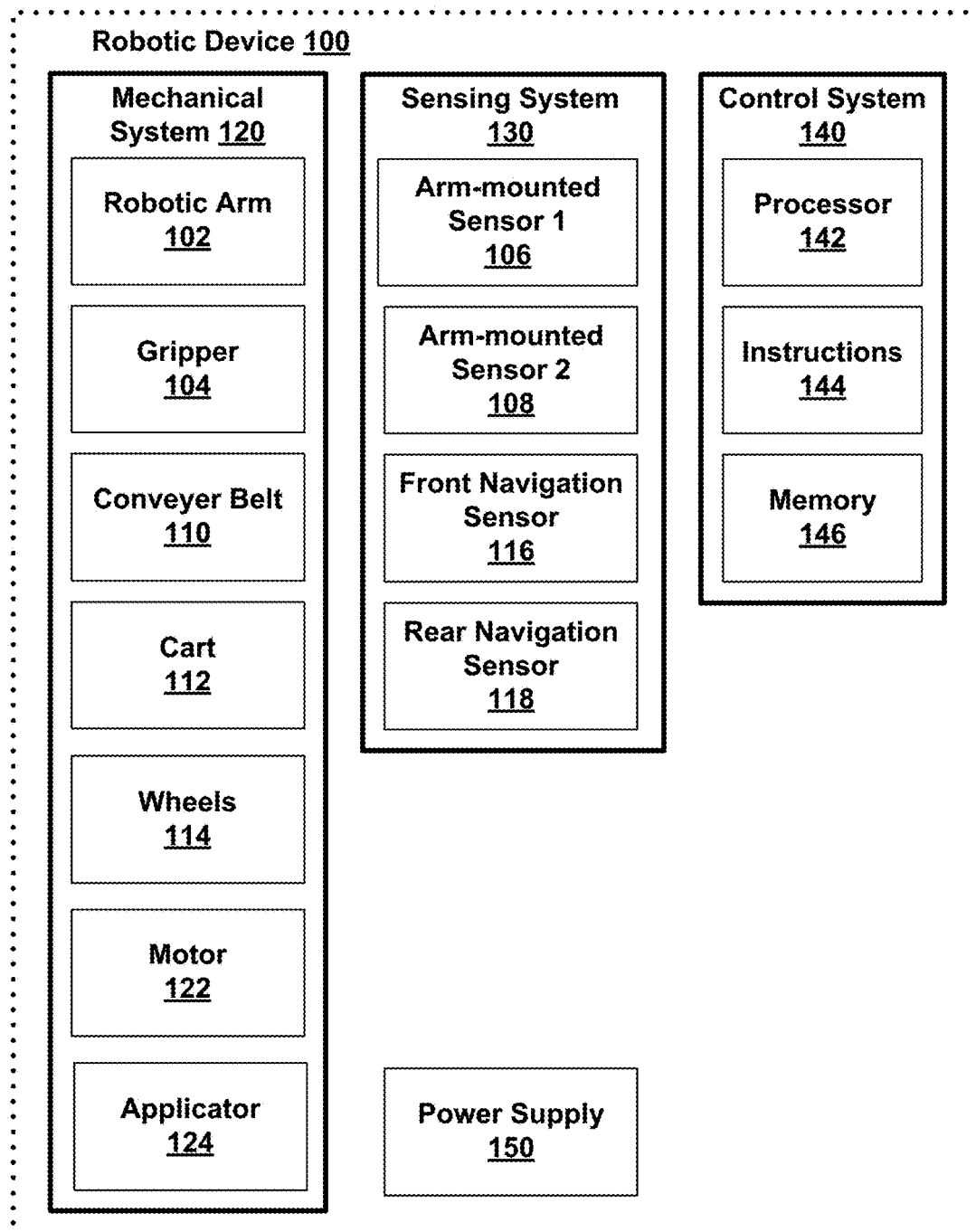
FIG. 1B is an operational block diagram illustrating a robotic device, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the terms "sensor," "camera," or "optical sensor" may be used interchangeably and may refer to device or devices (mono or stereo arrangements) configured to perform three-dimensional (3D) image sensing, 3D depth sensing, two-dimensional (2D) image sensing, 2D depth sensing (i.e., 2D image and corresponding depth map), and/or other types of sensing of a physical environment of the device.

In some scenarios, a robotic device may occupy an environment that includes little or no discernable and unique features that the robotic device can use as landmarks for constructing a map of the environment and for periodically or continuously sense the robotic device's location, orientation, and distance travelled in the environment (e.g., by way of localization, mapping, and visual odometry). For instance, a factory floor that serves as a workspace for a robotic device (e.g., a gantry system or other robotic device configured to move objects) may include blank floors, walls, etc. that lack such features, and thus it may be difficult for the robotic device to perform localization on the factory floor. Other surfaces such as metal floors, glass, concrete walls, chain link fences, and paneling, among others, may lack such features as well. Furthermore, in scenarios where it may be advantageous for the robotic device to sense a position of a moving object, such sensing may be at least partially impeded when the moving object lacks discernable and unique features as well.

Accordingly, it may be desirable for globally-consistent features to be present in such an environment on static and/or moving objects that occupy the environment. Globally-consistent, static features may serve as an advantage over less consistent features, such as light patterns that may be projected onto various portions of the environment to facilitate localization and visual odometry. Light patterns projected by one or more cameras may move as the camera moves, and thus the patterns may not be present on an object in the environment for a long enough period of time for the robotic device to sense a position of the object and/or use the object as a landmark for localization. Globally-consistent features, on the other hand, may be detected by a camera so that the camera can sense rigid motion of objects that include such features from frame to frame.

In some implementations, a robotic device (or other device that occupies the environment) may provide globally-consistent features to the environment that the robotic device occupies. Further, the robotic device may provide such globally-consistent features in response to determining that the environment and/or particular objects present in the environment lack sufficient features (e.g., recognizable patterns or other details) for facilitating the robotic device's localization, visual odometry, motion sensing, and/or other operations. For example, upon determining that a blank white wall lacks any discernable pattern or texture, the robotic device may be configured to provide—using paint, ink, or another tangible material—unique patterns and/or textures (2D or 3D patterns/textures) onto various objects, surfaces, etc. in the environment that can be sensed with a camera. The robotic device may be configured to apply/provide tangible material to be used as globally-consistent features by means other than spraying as well.

In some scenarios, permanent material may be used for the applied patterns/textures, such as permanent inks, paints, etc. which may be visible or invisible. Additionally or alternatively, non-permanent material may be used for the patterns/textures, such as ink that evaporates after a few minutes or after however long of a period of time that the robotic device may need to sense a position of an object, perform localization, and/or perform other operations that utilize the pattern/texture. Such permanent or non-permanent materials may be reflective or non-reflective. Materials that may be used in accordance with ultraviolet (UV) light or infrared (IR) projectors may be used by the robotic device for providing the patterns/textures.

The patterns/textures that the robotic device applies to the environment may be predetermined or random. In either case, the robotic device may apply patterns/textures that may be easier for cameras to detect and sense a position of. One or more patterns/textures may be statistically unique and suited for specific feature detectors (e.g., gross corners, fractal patterns, etc.). The robotic device may include feature descriptors that can differentiate one pattern/texture from another. Further, the robotic device may apply different patterns/textures based on the type of object or surface that the pattern/texture is to be applied to.

Various additional examples are described below, therefore the above examples are not meant to be limiting.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

While some robotic devices may be fixed at a location in an environment, in some implementations, a robotic device can be made mobile by coupling the robotic device with a wheeled base, a holonomic base (e.g., a base that can move in any direction), or rails on the ceiling, walls or floors. According to various implementations, a robotic manipulator may be mounted on a holonomic base (e.g., a base with wheels that allow the base to move in any direction). FIG. 1A depicts an exemplary holonomic base containing a robotic manipulator. In some implementations, a moveable base 112 may include a robotic arm 102 mounted on the base 112. The robotic arm 102 may contain a gripping component 104 for gripping objects within the environment. The base may contain one or more wheels 114, which may be holonomic wheels that operate with two degrees of freedom. In further implementations, a wraparound front conveyor belt 110 may be included on the holonomic base 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In still other examples, one or more robotic manipulators may be mounted on rails of a truck or container. In such examples, the robotic manipulators may be used to load or unload the truck or container.

FIG. 1B is a functional block diagram illustrating a robotic device 100, according to an example implementation. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) base 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example implementation, one or more banks of such batteries could be configured to provide electrical power. Other power supply materials and types are also possible.

The mechanical system 120 may also include an applicator 124. The applicator 124 may generally take the form of any device or combination of devices configured to provide material to surfaces by way of printing (e.g., print using a dot matrix pattern application), brushing, air-spray, airless spray, electrostatic spraying, powder coating (e.g., paint powder), rotary atomizing, dip coating, flow coating, roll coating, electro-coating, and auto-deposition, among other possibilities. The applicator 124 may be used by the robotic device 100 to provide a material onto one or more surfaces in an environment that the robotic device occupies. For instance, the applicator 124 may take the form of a paint roller, bristled brush, airbrush, or other device that can apply a material such as ink, dye, paint, or other material that may be at least partially liquid onto various surfaces such as wood, cloth, concrete, metal, glass, and drywall, among other possibilities. It should be understood that, in some implementations, the material may be in powder form, such as paint powder, ash, cosmetic powder, and the like. Such materials, liquid or powder, may be at least partially adhesive or otherwise capable of remaining on a surface for a given period of time after being provided to the surface.

Furthermore, the applicator 124 may include one or more nozzles or other precision devices to facilitate precise application of such material to various surfaces. Other devices designed to control direction or other characteristics (e.g., velocity) of a fluid flow are possible as well. Such devices, including nozzles, may be configured to apply materials onto surfaces in a given pattern and/or given surface. As such, the applicator 124 may be directed by other components of the robotic device 100 to select a particular nozzle or device that may facilitate application of a material to the surface in accordance with a predetermined pattern. The applicator 124 (and/or other applicators (not shown) included as part of the robotic device 100) may be controlled by other components of the robotic device 100 in other ways as well.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system 130 may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading objects, for instance.

Within examples, the robotic arm 102 may be equipped with a gripper 104, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures. Other types of grippers are possible as well.

In some implementations, the gripper could potentially span several boxes or objects and turn on suction for some or all of the covered objects. In some implementations, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some implementations, the suction devices can sense after a certain amount time whether they can successfully grip a surface, after which they may automatically shut off. In further implementations, sections of the suction devices can fold down to grasp the top of the boxes. For instance, grippers can initially start at full extension and then conform to the surface being gripped.

In further examples, the robotic arm can implement a wiggle movement to improve a suction grip. In additional implementations, the robotic arm can wiggle a box side-to-side to help segment the box from its surroundings. In other implementations, the arm can wiggle upon pick up of the box to avoid jostling other objects. In such implementations, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air. According to various implementations, physical objects can have concave, convex or otherwise rumpled faces that make it hard for a suction device to adhere to. Thus, wiggling the suction device as the device makes suction contact may enable a more reliable grip on physical objects, both planar and non-planar objects.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various implementations, cues such as barcodes, texture coherence, color, 3D surface properties, or printed text on the surface may also be used to identify an object and/or find its pose in order to know where and/or how to place the object (e.g., moving the object slowly due to the object being fragile). In some implementations, shadow or texture differences may be employed to segment objects as well.

Many or all of the operations of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some implementations, memory 146 may contain instructions 144 (e.g., program logic) executable by the processor 142 to execute various operations of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
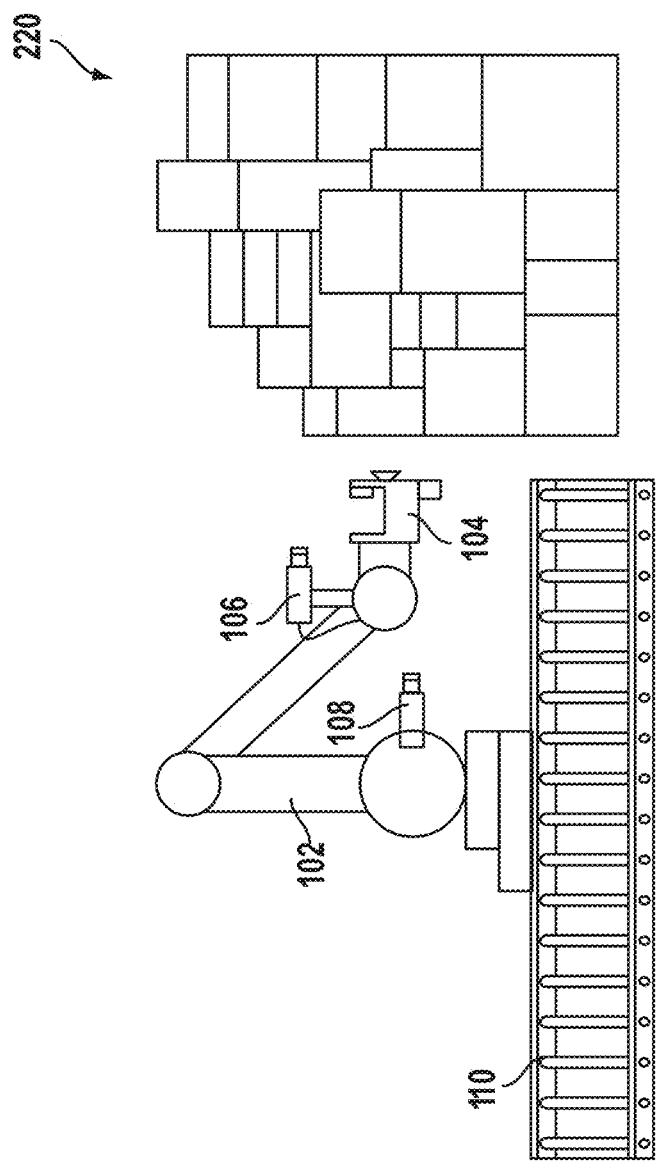
FIG. 2A shows a robotic arm and a stack of boxes, according to an example implementation.

According to various implementations, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example implementation. As shown, the robotic device may include a robotic arm 102 with a gripping component 104, sensors 106 and 108, and conveyer 110 as described above. In some examples, the robotic device could be mounted on a holonomic base as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
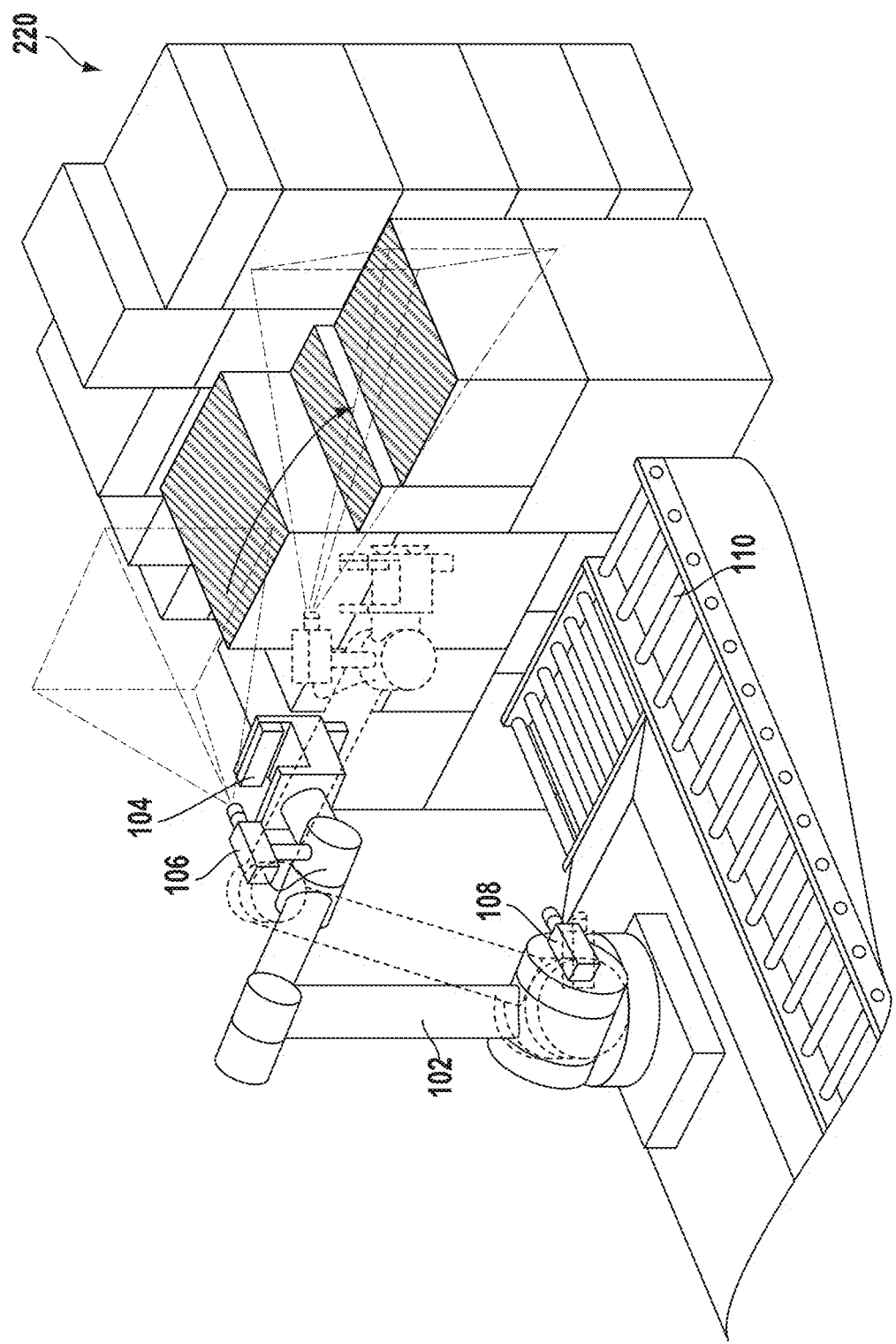
FIG. 2B shows scanning of the stack of boxes from FIG. 2A by a sensor mounted on the robotic arm, according to an example implementation.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various implementations, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal object may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

Figure 2C:
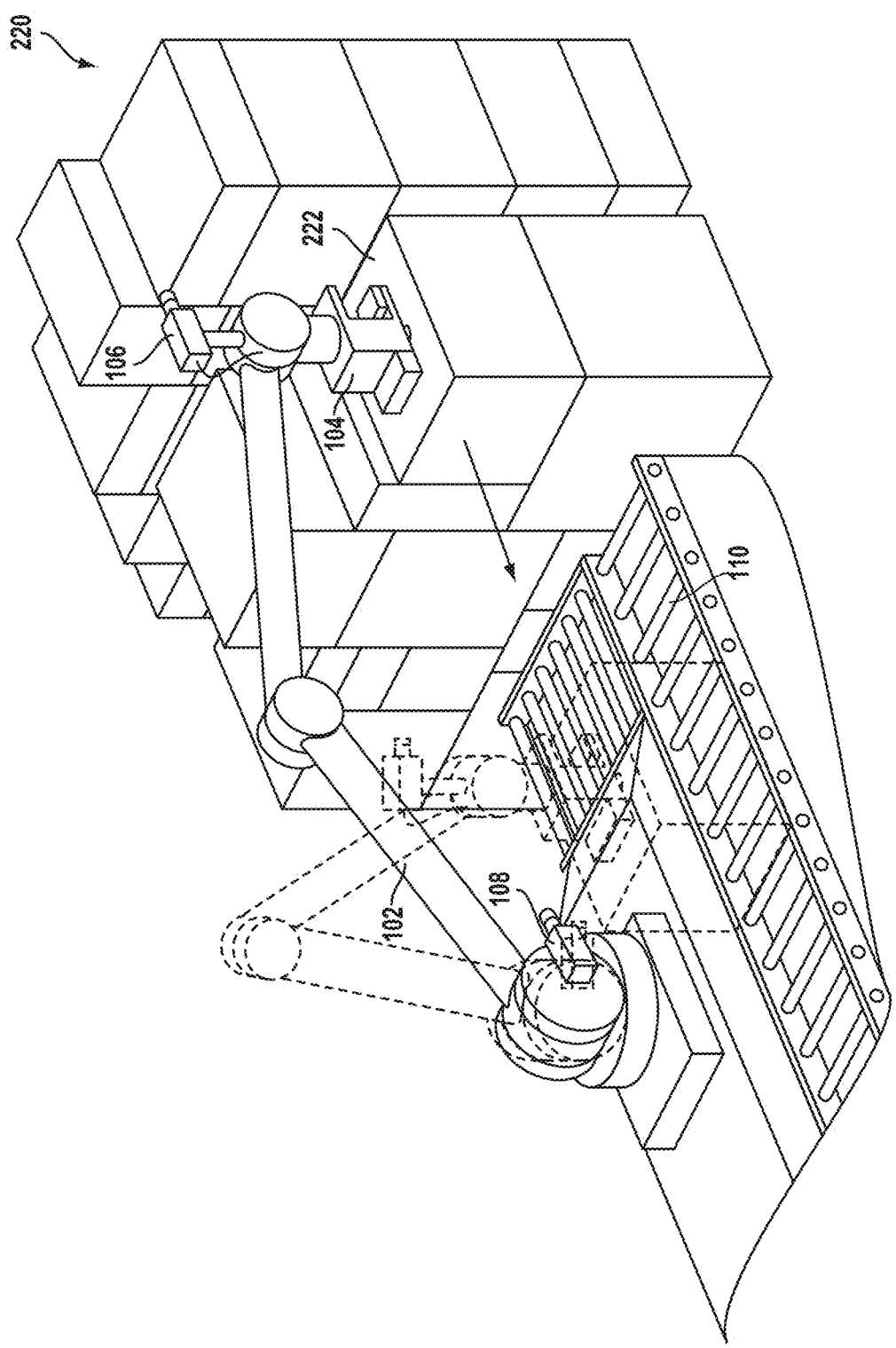
FIG. 2C shows the robotic arm from FIG. 2A moving a box, according to an example implementation.

In further examples, a facade may be constructed from boxes, for instance to plan an order for picking up the boxes. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some implementations, path constraints, such as collision avoidance for robotic arms, cameras, cables, and/or other components, may be put in a constraint based planning solver and solved for to yield a best path to move the arm for perception. Additionally, in some implementations, the solver may determine a best path for picking up, moving, and placing an object.

Figure 3:
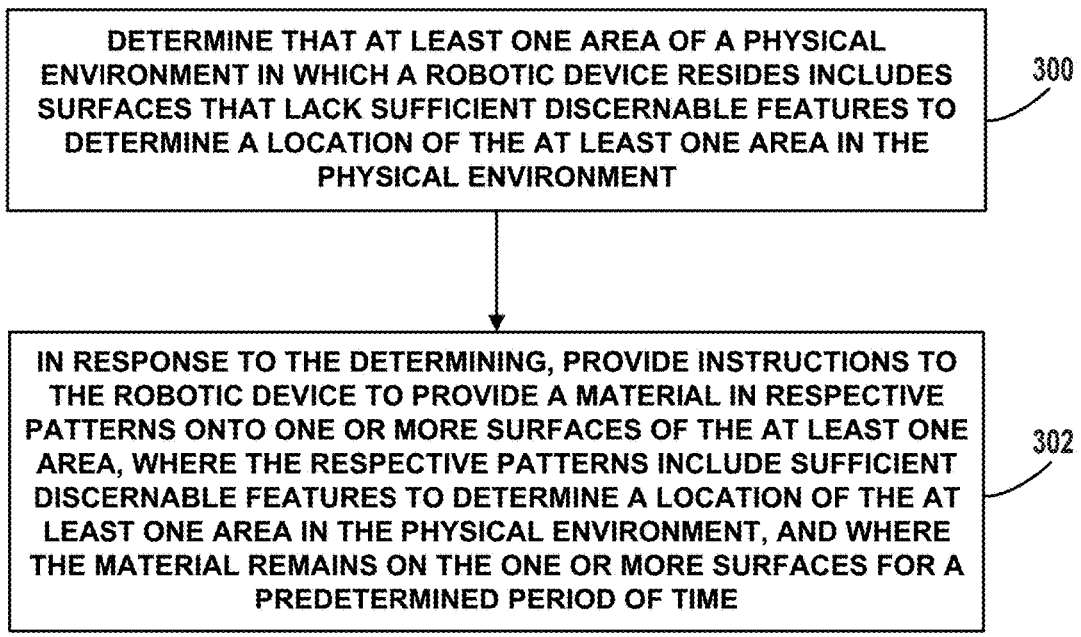
FIG. 3 is a flow chart of an example method, in accordance with at least some implementations described herein.

FIG. 3 is a flow chart of an example method for providing globally-consistent landmarks to facilitate robot localization and visual odometry. The method shown in FIG. 3 presents an implementation of a method that, for example, could be used with the systems shown in FIGS. 1A-2C, for example, or may be performed by a combination of any components of in FIGS. 1A-2C. In addition, such an implementation of a method could be carried out in accordance with the systems and aspects illustrated in FIG. 5. The method may include one or more operations, or actions as illustrated by one or more of blocks 300-302. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of the method, and operations of other methods and processes disclosed herein, may be performed at least in part by a computing device or computing system configured to control a robotic device and/or other components (e.g., sensors located remotely from the system) that are associated with the robotic device. However, it should be understood that example methods, such as the methods shown in FIG. 3 and FIG. 4, may be carried out by other entities or combinations of entities (i.e., by a server, or by other computing devices and/or combinations of computing devices), without departing from the scope of the invention. Some operations of the method may also be described to be performed by a robotic device itself, although such language may refer in actuality to such operations being performed by a computing system configured to control the robotic device.

At block 300, the method involves determining that at least one area of a physical environment in which a robotic device resides includes surfaces that lack sufficient discernable features to determine a location of the at least one area in the physical environment. Herein, surfaces of the at least one area that are described as "lacking" sufficient discernable features may refer to surfaces that have no discernable features at all, or may alternatively refer to surfaces that have threshold low discernable features (e.g., features that can be detected by a robotic vision system, but may not provide the robotic device with sufficient information to facilitate localization of the robotic device, visual odometry of the robotic device, and/or object identification, among other operations). For instance, in some implementations, the robotic device may use one or more optical sensors to determine at least one image of the one or more surfaces and then engage in an attempt to extract discernable features from the at least one image. If the number of features that are extracted is threshold low (e.g., zero), the robotic device may determine that the one or more surfaces lack the discernable features.

In practice, a feature detector may be used to detect such discernable physical features in an environment, such as points, edges, patterns, textures, etc. A given physical feature may be referred to as a "detected" feature when that same given physical feature is present in multiple images and can be detected in multiple images (i.e., a "repeatable" feature), taken from different vantage points, rather than just present and detected in one or a few images. When moving a camera through a scene and capturing multiple images, some "features" detected in one image may not be detected between successive images of the multiple images, and thus, those the feature detector may determine that no features have been detected. In some scenarios, when no discernable features exist in a scene, any semblance of a "feature" detected by the feature detector may merely be the result of noise. One example method to verify whether a feature is detected in multiple images is by using optical flow (e.g., determining a pattern of apparent motion of objects, surfaces, and edges in a visual scene caused by relative motion between a camera and the scene) and verifying that point correspondences between frames obey a rigid transformation model. When features are not unique, a rigid transformation that is estimated may not make physical sense, and may appear to slip or jitter randomly.

For features to be used as globally-consistent landmarks, it may be important that the feature be repeatable, and a descriptor of the feature (i.e., how a given feature is represented, such as a Boolean variable used to represent an edge) should be reasonably unique, so that the descriptor may be used for descriptor matching between correspond features in images captured from different views. Descriptors that are extracted from detected features may be compared to descriptors from proximate features (i.e., other features near the feature in physical location). In one example, a radius search may be performed, where if a large number of descriptors from different physical features fall into a small radius, the descriptor may not be useful for feature matching. In practice, it may be advantageous for descriptors to be repeatable. Similar to features, descriptors in one view and corresponding descriptors in another view should obey a rigid transformation model.

In some implementations, a computing system may determine that surfaces in a scene lack sufficient patterns/textures to perform operations such as localization and visual odometry when feature repeatability, descriptor uniqueness, and descriptor repeatability are measured, quantified, and determined to be below threshold levels. Such threshold levels may be chosen such that the probability of being able to perform accurate odometry or re-localization is high, which may vary based on how the feature detection is being applied.

Generally, the physical environment referred to at block 300 may include any environment that a robotic device occupies, navigates through, and interacts with in order to perform tasks. For instance, the physical environment may include a warehouse or factory where one or more autonomous or non-autonomous robotic devices move around and load, unload, carry, manufacture, or otherwise interact with objects present in the environment, such as boxes, trucks, and other robotic devices or machinery, among other possibilities.

Within examples, the at least one area of the environment that is determined to lack the features may be one or more surfaces of a wall, corner (e.g., two walls that meet), floor, door, or ceiling in the environment. For instance, some types of walls and floors, such as walls/floors comprising only one or more plain colors (e.g., white), concrete walls/floors, wall paneling (e.g., wood paneling), fences (e.g., chain link fences, featureless wood fencing, etc.), glass, and the like, may lack such features. Further, even more patterned and textured surfaces such as brick may also lack such features. Still further, surfaces such as grass and dirt may lack such features.

Within examples, the at least one area of the environment that is determined to lack the features may be one or more surfaces of an object located in the environment. Such an object may take the form of a tangible object capable of autonomous movement (e.g., another robotic device, an autonomous vehicle, etc.) or assisted movement (e.g., a box being picked up and moved by a device or person, a vehicle, etc.). Such an object may take the form of a tangible object that is not capable of movement as well. Other examples of objects are also possible.

When a surface of an object lacks such features, a robotic device may not be able to sense that the object is in the process of moving. For instance, the robotic device may acquire successive images of the environment as the object is moving, where the images include the object. However, when the object lacks recognizable features, the robotic device may not know that the object has moved between the successive images. Thus, when the object includes recognizable features, the robotic device may be able to sense a location of the object over a period of time as the object moves, and may in turn be able to determine a velocity and direction of the object.

In order to perform various tasks or otherwise interact with the environment (e.g., periodically or continuously sensing a position of an object), a robotic device may implement various navigation techniques to navigate through the environment while determining the robotic device's location and orientation at various points in time. Navigation techniques may include map-based navigation and localization-based navigation, for instance. With map-based navigation, the robotic device may use a map of its environment (e.g., a metric map or topological map), which may then be used to navigate to a particular location on the map. With localization-based navigation, the robotic device may be capable of navigating in an unknown environment using localization. Localization-based navigation may involve a robotic device building its own map of its environment and calculating its position within the map and/or the position of objects in the environment. For example, as a robotic device moves throughout its environment, the robotic device may continuously use localization to update its map of the environment. This continuous mapping process may be referred to as simultaneous localization and mapping (SLAM). Other navigation techniques may also be utilized.

When a robotic device recognizes discernable features at areas in the environment, the robotic device may then determine, for instance, a location of the area (e.g., an approximate localization of the surface that contains the feature), a location of the robotic device with respect to the location of the area (e.g., a localization of the robotic device), and/or a location of other areas in the environment with respect to the robotic device and the location of the area. As such, as the robotic device moves through an environment and detects such features, the robotic device may continue to build and update a map of the environment, thus enabling the robotic device to travel through the environment and interact with various areas or objects in the environment.

As noted above, robotic devices may also determine changes in the robotic device's position and orientation through a visual odometry process. An example visual odometry process may involve the robotic device acquiring input images of an area of an environment using single cameras, stereo cameras, or omnidirectional cameras, among other devices as the robotic device travels in the environment. The images may then be processed to remove lens distortion and/or correct other aspects of the images. Features present and repeated across multiple images of the environment may then be detected. For instance, images may be compared and features may be extracted from the images and matched. An optical flow field vector (e.g., a vector that represents apparent motion of an object, surface, and edge, as perceived by the robotic device) may then be constructed, by way of the Lucas-Kanade method or other methods. Various feature detection processes may be implemented, such as edge detection, corner detection, blob detection, ridge detection, and the like. Features detected at this stage may or may not be sufficient to facilitate accurate and precise visual odometry. The optical flow field vectors may then be checked for errors and outliers may be removed if found. The camera motion may then be estimated based on the optical flow using a Kalman filter or other estimation process. When a dense visual odometry method is being used, it may result in an estimate that deviates significantly from an expected estimate.

At block 302, the method involves, in response to the determining, providing instructions to the robotic device to provide a material in respective patterns onto one or more surfaces of the at least one area. Additionally or alternatively, the material may be provided in respective textures onto the one or more surfaces. The respective patterns/textures may include discernable features to determine a location of the at least one area in the physical environment. The material may be a tangible material designed to remain on the one or more surfaces for a predetermined period of time. In some implementations, the respective patterns/textures may include discernable features to determine a location (e.g., a localization) of the robotic device. In some scenarios, the robotic device may have previous knowledge of how long the material may remain on the surfaces and may be instructed to provide the material to surfaces based on this knowledge.

The material may include non-reflective paint, reflective paint, invisible ink, and disappearing ink, dye, or another type of material. The material may be at least partially liquid, although in other implementations the material may be a solid object with a given pattern and/or texture that can be adhered to a surface that lacks discernable features. When providing a 3D texture to a surface, the robotic device may apply a material that may harden over time to form a solid with a discernable 3D texture (e.g., paint, cement, stucco, etc.). Other methods for providing a 3D texture onto a surface are possible as well.

As discussed above, the material may be provided onto the surfaces using an applicator coupled to the robotic device (e.g., coupled at the end of a robotic arm) or located remotely from the robotic device. The type of applicator used may depend on the type of robotic device. For example, a mobile robot may have the applicator on the bottom, facing the ground, so that it can lay down patterns/textures on a floor (e.g., a lime laying machine). As another example, a paint roller dragged by a mobile base may be used to apply patterns/textures to a floor. As another example, an applicator such as an air brush or paint brush may be mounted on the end of a robotic arm, so that a general purpose robot arm may perform detailed painting of surfaces. As another example, for quick application of material to large areas, spraying a liquid or powder form of a material from a pan tilt unit mounted to the top of a mobile base may be desirable (e.g., a spray head with different settings, such as mist, shower, stream, etc.). As still another example, the robotic device may include a turret with a paintball gun mounted on it for providing the material. As yet another example, rags or tassels coated with paint or another material on spinning spindle may be used to provide the material, where centripetal force pulls droplets of material off of the tassels and splatters the material on the surface. Other examples are possible as well.

The material may be at least partially adhesive or otherwise capable of remaining on a surface for a given period of time after being provided to the surface. For instance, material may be provided such that the material remains on a surface for at least a period of time equal to a period of time for the robotic device to complete a localization or visual odometry process involving the surface.

In some implementations, instructions may be provided to the robotic device to provide a given material in a given pattern/texture onto a surface based on a type of the surface at the at least one area in the environment and/or a type of object to which the surface belongs. For example, before providing the instructions, the robotic device may identify the surface and determine a classification for the surface or the object to which that the surface belongs based on one or more properties of that surface and/or that object. The surface or object to which the surface belongs may be identified using various object recognition algorithms. For instance, the robotic device may capture at least one image of the surface/object and compare the images to a known image or template of other surfaces/objects, including known surfaces/objects and/or unidentified surfaces/objects. If one or more of the images substantially match a known image or template, the surface or object may be identified to be the surface or object associated with the known image or template. In another instance, the robotic device may compare detected features of the images of the surface/object with previously-detected features of known images or templates to check if a threshold high number of features extracted from the images substantially match known features associated with the known images or templates.

The classification may be representative of a type of surface that lacks sufficient discernable features to determine a location of the at least one object in the physical environment, a type of pattern of the type of surface, and/or a type of texture of the type of surface (e.g., an apparent texture of the surface based on the images of the surface, or an actual physical texture of the surface, such as bark on a tree, raised areas of a brick wall, blades of grass, woven fibers, etc.). For instance, the classification may indicate characteristics of the surface or the object such as that the surface is a plain color and/or that the surface is comprised of a stucco material or other 3D texture. Further, the classification may indicate that the surface is a colorless, pattern-less, and/or texture-less surface. Such a classification may be associated with an identification of the surface or object itself. In one instance, the surface may be identified as a metal floor. In another instance, the object may be identified as a tree and the surface may be classified as bark. While some surfaces of objects, such as the bark of a tree, may have textures that can be detected and used as a landmark, the robotic device may still be instructed to provide a material onto those surfaces with a given pattern and/or texture in order to facilitate a threshold higher feature detection for localization or visual odometry.

In these implementations, the way the material is provided may be determined based on various factors or combinations of factors. In some scenarios, a type of material to be provided may be selected based on the identification of the surface/object and/or the classification. For instance, if the surface is identified as a chain link fence, instructions may be provided to the robotic device to provide a reflective paint or other reflective material in a pattern on the chain link fence such that the material can be reflected back to one or more optical sensors to facilitate detection of that pattern. In another instance, if the surface is identified as a cardboard box surface, an evaporative material, such as ink, may be selected to be provided. In such an instance, evaporative materials may be selected based on predetermined assumptions that it may not be desirable to have the material remain permanently on a given surface. Such predetermined assumptions may be provided to the robotic device as data, and the robotic device may check such data before providing a material in order to verify that the material that is provided and/or the manner of which the material is provided is suitable for the surface to which the material is being provided.

In other scenarios, a type of material to be provided may be selected based on the classification and known methods that the robotic device may implement in order to detect patterns and/or textures of the material. For instance, an invisible ink that is sensitive to UV light may be selected to be provided to a cardboard box surface when a UV light may be used when searching for and detecting features at a later point in time. In another instance, an IR fluorescent paint may be provided to a metal floor based on the classification indicating that the floor is metal and further based on IR light that will be projected onto the floor to detect features on the floor.

In still other scenarios, a type of applicator for providing the material may be selected based on the type of material and/or based on a determined pattern/texture. For instance, certain nozzles of a given application may be better suited for spraying a material in a given pattern (e.g., a more precise nozzles for a more precise, detailed pattern), and may thus be selected based on the given pattern. In another instance, if the pattern to be provided is a dot matrix pattern, a dot matrix applicator (e.g., a printer) may be selected for providing the material. In another instance, if the material is to be provided as a line to enable the robotic device to perform line following, a paint roller may be used to apply the material. In still another instance, if square features are desired, a rubber stamp or sponge may be pushed onto the surface to apply the material. In yet still another instance, more complex patterns may be applied using a predetermined stencil in front of a sprayer (e.g., a spray paint gun). Other examples are also possible.

In some implementations, patterns or textures applied to a scene may simplify localization and visual odometry methods. By way of example, if a pattern applied contains a structure that has known measurements between features, such as multiple black dots with 0.1 meters separating each dot (e.g., the applicator may cause this separation, by use of devices such as a double parallel barrel paintball gun, or sponges filled with paint and fixed to the ends of a 0.1 meter tube), such a pattern may be used to establish a scale for SLAM measurements.

In some implementations, instructions may be provided to the robotic device to first provide a primer material onto a surface before providing the material. Such instructions may be provided, for instance, based on the classification indicating that the surface is a type of surface to which the material may not easily adhere. Other bases for providing such instructions are also possible.

In some implementations, instructions may be provided to the robotic device to first provide a first material onto a surface to outline or otherwise lay out where the pattern/texture will be provided.

In some scenarios, patterned and/or textured surfaces such as brick may be present in multiple locations throughout an environment and may be recognized by a robotic device. However, because such surfaces may be present in more than one location, a robotic device may not be able to use such a surface as a landmark for localization and visual odometry and thus may not accurately and precisely determine the robotic device's location in the environment, the location of the surface, etc. Thus, in such scenarios, and in general scenarios where it is desirable for detected patterns/textures to not be confused with other detected patterns/textures, the robotic device may be instructed to provide patterns or textures to the environment that are each statistically unique. In line with the discussion above, descriptors present in a pattern/texture of a surface should match best to itself in successive images, and match poorly to other descriptors at other locations, thus making the pattern/texture associated with those descriptors statistically unique.

In some implementations, it may be advantageous for a given pattern/texture to be suited for a specific feature detector. For example, with a feature detector that finds 90 degree corners, a pattern provided to a surface may include 90 degree corner features, and the feature detector may thus be tuned for an expected size of the corner features and a contrast of the corner features with the surface onto which the pattern was provided. The descriptor used in this scenario may combine the moment (rotation of corner feature) and local image neighborhood to create a rotation invariant vector that describes the feature, and the descriptor should have enough discriminating information in order for the descriptor to be useful when matching descriptors. As such, an ideal pattern to provide to a surface may be a pattern that includes many corners and whose local neighborhood around each corner is distinct and visually creative.

Figure 4:
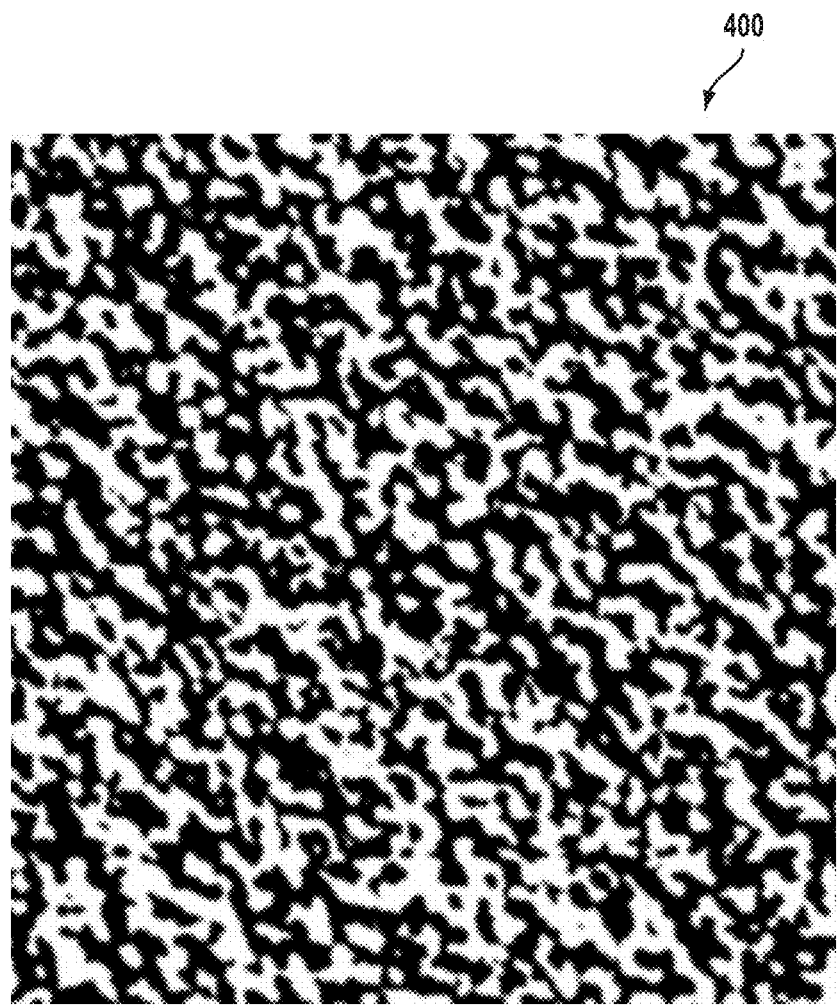
FIG. 4 illustrates an example pattern that may be provided to a surface, in accordance with at least some implementations described herein.

FIG. 4 illustrates an example pattern 400 that may be provided to a surface. Namely, the example pattern 400 is an example randomly-generated plasma fractal pattern that may serve as a unique pattern, thereby providing discernable features to a surface to which the pattern may be provided, and thus facilitating use of the surface/pattern combination as a globally-consistent landmark.

In some implementations, upon determining that multiple surfaces at different locations in an environment each lack discernable features for localization and visual odometry, the robotic device may be instructed to provide relative, unique patterns/textures onto each of the multiple surfaces. In such implementations, the relative, unique patterns/textures to be provided may be randomly-generated by the robotic device or may be predetermined. After a random pattern/texture is provided, the robotic device may determine whether it can detect the pattern/texture. If the robotic device determines that it cannot detect the random pattern/texture, the robotic device may be instructed to provide a new pattern/texture. Alternatively, the robotic device may have stored data associated with the random pattern/texture that may enable the robotic device to replicate that pattern/texture, and may refer to that stored data to reapply the same pattern/texture that was randomly-generated before.

As an example of feature detection with unique patterns, black dots with random radii may be sprayed in random locations on a surface. In this example, a feature detector for such a pattern may involve a circular blob detector. Further, when performing localization with features detected from this pattern, constellations of detected blobs may be used as the descriptor. Such a descriptor may be useful for high-dimensional nearest-neighbor searches.

In some implementations, the robotic device may capture one or more images of patterns/textures after they are provided to a surface. The robotic device may then refer to the one or more captured images when performing actions such as (i) verifying that the pattern/texture is still present on the surface, (ii) verifying whether enough of the pattern/texture remains on the surface to facilitate feature detection, (iii) feature detection, and (iv) reapplying the same pattern/texture to the surface as the pattern/texture that was applied previously, among other possible actions. The captured images can also be used to generate a template associated with the provided pattern/texture.

In some implementations, the robotic device may be provided with instructions to paint over a previously-applied material or otherwise remove that material from sight. For instance, the robotic device may detect a pattern or texture that is insufficient for localization or visual odometry and responsively paint over that pattern or texture. The robotic device may then be instructed to reapply a statistically new pattern/texture or reapply the same pattern/texture that was present before. For example, as a robotic device first builds a map of its environment, the robotic device may store data associated with each pattern/texture that it provides to the environment (e.g., a captured image of the pattern/texture, a location of the pattern/texture on a map in the environment, etc.).

It should be understood that in some implementations, the material may be provided in the respective patterns and/or textures at least in part by a human or other device that may not be in direct communication with the robotic device. For example, a human may manually paint an empty warehouse with various patterns/textures at various locations throughout the warehouse, so as to provide robotic devices that may later occupy the warehouse with landmarks to use for localization and visual odometry. In another example, based on data acquired by one or more optical sensors that indicates that surfaces lack discernable features, the robotic device or other computing system may provide a notification (e.g., a visual and/or audio indication, such as an alarm, text message, email, and the like) to a human or to another computing device (e.g., a smartphone) indicating that the surfaces lack such features. Other examples are possible as well.

In some implementations, the method may further involve detecting, at a point in time after the patterns/textures have been provided to the one or more surfaces of the at least one area, the respective patterns of the material on the one or more surfaces of the at least one area. This detecting may be performed by the same robotic device that applied the material, or may be performed by a different robotic device or computing device.

It should be understood that the detected respective patterns may also refer to detected respective 2D textures and/or 3D textures provided to the at least one area. The respective patterns (and/or respective textures, in some examples) may be detected and the features may be determined from the patterns/texture using one or more feature detection methods or other techniques used for detecting patterns and textures and determining features from the patterns and textures, including but not limited to methods and techniques referred to above.

In some implementations, the robotic device may project light onto the at least one are at substantially a location of the respective patterns/textures of the material using one or more types of projectors. The robotic device may then use one or more optical sensors to detect the respective patterns/textures of the material at substantially that location. The projector and light that is projected may be selected based on a type of material that was provided to the at least one area. For instance, if IR fluorescent paint was provided, the robotic device may project IR light to better detect the painted patterns/textures. In another instance, if ink that is sensitive to UV light was provided, the robotic device may project UV light to better detect the patterns/textures. Other examples are possible as well.

In some implementations, the method may still further involve, based on the determined discernable features, determining a location of the at least one area with respect to a location of the robotic device in the physical environment. Additionally or alternatively, the method may involve determining a location of the at least one area with respect to a location of a different robotic device or with respect to a location of an object or a different area. As noted above, the determined location of the at least one area and the determined location of a robotic device may be used for a visual odometry and a localization of that robotic device. In addition, when the detected respective patterns are present on at least one surface of an object (e.g., a box, vehicle, etc.), the robotic device may sense a location of the at least one object as the at least one object moves over a period of time. Within examples, the robotic device may also be able to determine a speed and orientation of the at least one object as the at least one object moves over the period of time.

Thus, the respective patterns may include discernable features to determine a localization of the robotic device, a visual odometry of the robotic device, and a position and orientation of the at least one area when the at least one area is a moving object, among other determinations associated with the at least one area, the robotic device, and the physical environment of the robotic device.

As noted above, the robotic device may determine its localization in addition to determining at least one map of the physical environment, where at least one map may be geometrically consistent with the environment. For instance, the robotic device may use SLAM techniques. A map of the environment may include a topological map and/or a metric map. For a topological map, distances between landmarks and distances between the robotic device and respective landmarks may be stored, and the map may take the form of a graph where the landmarks are represented as nodes and arcs between nodes represent paths between the nodes. For a metric map, precise coordinates of landmarks may be stored and represented on the map. Other types of maps are possible, and other robotic mapping algorithms are possible as well. Such maps may include various forms of visual representations of at least one landmark in the environment, and may be used for task planning, trajectory planning, and other operations of the robotic device involving navigation within the physical environment.

In some implementations, upon detecting that a surface or surfaces of an object or area lacks discernable features for localization, visual odometry, or other operations, instructions may be provided to the robotic device to provide a material on the surface(s) in the form of "fiducial markers," or important marked points or features that may be used to facilitate localization, visual odometry, interaction between the robotic device and the object or area, and/or interaction between the object or area and other devices or systems that are in communication with the robotic device. For example, the robotic device may paint fiducial markers on a box, where the fiducial markers may correspond to optimal grip points on the object, so as to enable the robotic device to grasp that object at the optimal grip points when the robotic manipulator moves that object. As another example, the fiducial markers may correspond to locations on an object at which the robotic device should drill, adhere, or otherwise interact with that object. Within examples, when the robotic device captures images of the environment and builds a virtual representation (e.g., a 3D model) of the environment, fiducial markers may be used for future automatic detection of important points or features, or alternatively mark a constructed CAD model (or other type of model) in a viewing window, for instance. Subsequently, when the object is detected and its pose is matched to the CAD model, the fiducial markers may be present in the CAD model, and can be used for control of various operations such as picking or grasping the object, machining, painting, or gluing.

Figure 5:
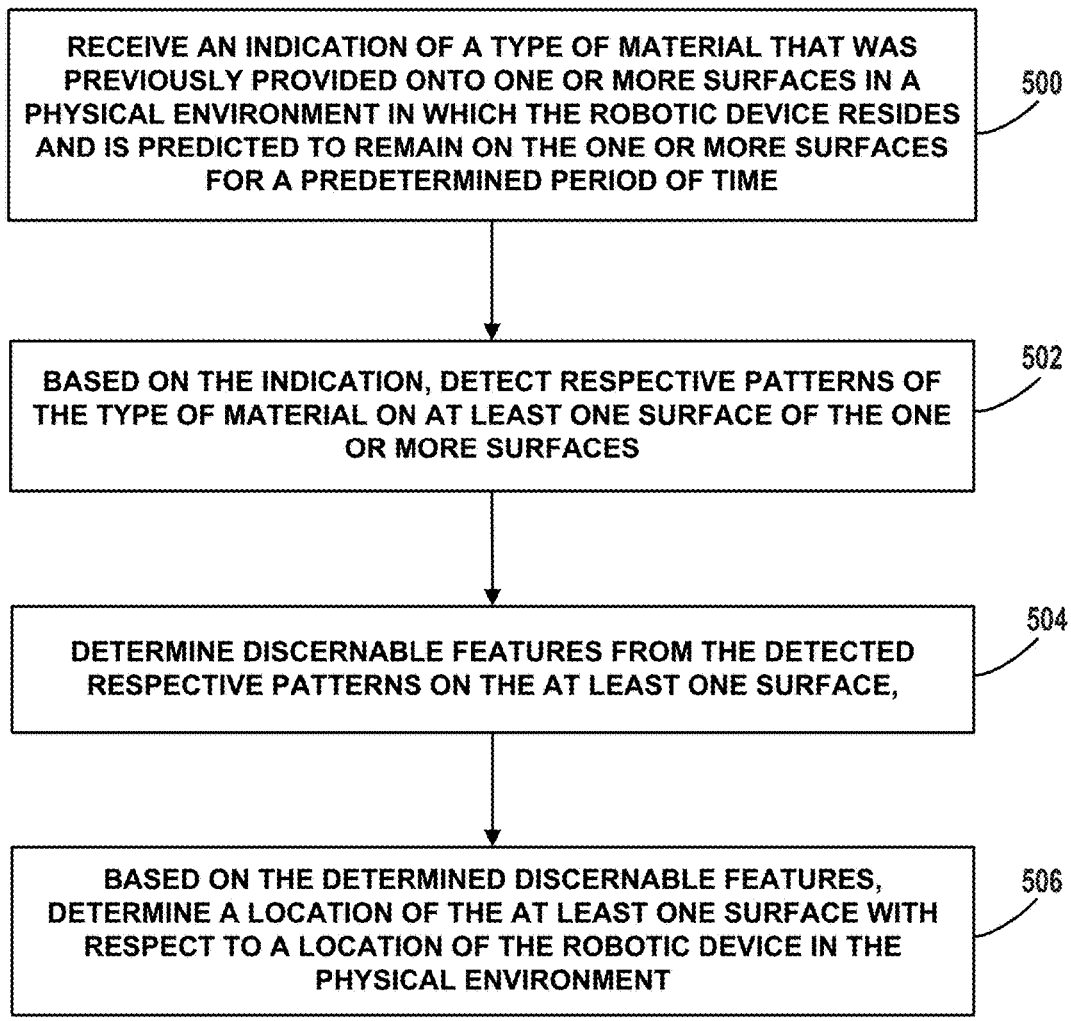
FIG. 5 is a flow chart of another example method, in accordance with at least some implementations described herein.

FIG. 5 is a flow chart of another example method for providing globally-consistent landmarks to facilitate robot localization and visual odometry. The method shown in FIG. 5 presents an implementation of a method that, for example, could be used with the systems shown in FIGS. 1A-2C, for example, or may be performed by a combination of any components of in FIGS. 1A-2C. In addition, such an implementation of a method could be carried out in accordance with the systems and aspects illustrated in FIG. 5. The method may include one or more operations, or actions as illustrated by one or more of blocks 500-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 500, the method involves receiving an indication of a type of material that was previously provided onto one or more surfaces in a physical environment in which a robotic device resides and is predicted to remain on the one or more surfaces for a predetermined period of time. The type of material may have been provided onto the one or more surfaces by the robotic device, by a different robotic device, by a human, or by another type of device, either automated or not automated. The indication of the type of material may be data associated with a type of material that was known to have been previously provided onto one or more surfaces in a physical environment in which a robotic device resides and is predicted to remain on the one or more surfaces for a predetermined period of time and may help the robotic device recognize a presence of the type of material on the one or more surfaces as the robotic device captures images of the environment. Within examples, the data may include a known pattern, texture, and/or other physical property that is inherent in the type of material. If the robotic device or other computing device in communication with the robotic device has detected the type of material before and/or has stored predetermined known physical properties of the type of material, the indication may indicate this. For instance, the indication may indicate features of a stucco material.

Within further examples, the indication may include data associated with the type of surface to which the patterned/textured material was provided. Such an indication may facilitate feature detection. For instance, based on an indication that the type of surface is a reflective surface, a computing system may filter out, mask, or otherwise ignore reflective portions of the surface so as to focus on non-reflective portions of the surface, which may include the material applied to the reflective surface. Other examples as possible as well.

In some implementations, the indication may also include data associated with a type of surface onto which the type of material was provided (e.g., non-reflective paint provided onto a reflective metal surface), which may further help the robotic device detect the patterns/textures in which the material was provided. Different types of surfaces may require specialized treatment when running the feature detector or descriptor. For example, for reflective metals, the metal may be masked out of the detector and descriptor image because the detector may assume a diffusely reflecting surface. And specular highlights (i.e., lights reflecting in the metal) may cause false positives, or corrupt descriptors. The mask may be created through camera motion, integrating multiple images, changing lighting conditions, and/or focusing on only information that behaves in a non-reflective manner, such as a patterned and/or textured material previously applied by a robot, human, etc.

As another example, for transparent surfaces such as glass, the transparent surface may similarly corrupt the features found because an object behind the glass may be in the neighborhood of a detected feature. A similar integration of multiple views may be used to mask pixels which were subject to parallax, to leave only the provided pattern/texture to analyze and detect features from. A chain link fence may also have properties similar to glass, as objects behind the fence may be easily noticed and may thus be in the neighborhood of a detected feature.

Within such examples noted above, the pattern/texture or reflective properties of a provided material, such as ink, may be used instead of motion to mask out portions of images that might corrupt the detected features. For instance, if only pixels that are saturated with a specific frequency of light are considered, specular or occluded pixels may be effectively ignored.

At block 502, the method involves, based on the indication, detecting respective patterns of the type of material on at least one surface of the one or more surfaces. And at block 504, the method involves determining discernable features from the detected respective patterns on the at least one surface. The patterns/textures may be detected and the features may be determined from the detected patterns/textures using one or more of the algorithms and/or processes noted above with respect to FIG. 3. For example, patterns of non-reflective material may be detected on reflective surfaces, so as to enable non-corrupt feature detection. Other examples are possible as well.

At block 506, the method involves, based on the determined discernable features, determining a location of the at least one surface with respect to a location of the robotic device in the physical environment. In line with the discussion above, the determined location of the at least one area with respect to the location of the robotic device may be used for a visual odometry and/or a localization of the robotic device. In addition, the robotic device may sense a location of the at least one object as the at least one object moves over a period of time using the respective patterns/textures. The robotic device may also be able to determine a speed and orientation of the at least one object as the at least one object moves over the period of time. The robotic device may also continuously determine the at least one object's location with respect to the robotic device's (or other robotic device's) location as the at least one objet moves.

It should be understood that the detected respective patterns may also refer to detected respective 2D and/or 3D textures provided to the at least one area.

Other components of a robotic system may also be involved in the processes for detect the patterns/textures and determining the discernable features from the detected patterns/textures, such as one or more processors that may process data acquired by the one or more optical sensors (e.g., images of the respective patterns) to facilitate these processes.

In some implementations, in response to determining a location of an object based on the detected patterns/textures, instructions may be provided to the robotic device to approach, grab, move, or otherwise interact with the object.

Figure 6:
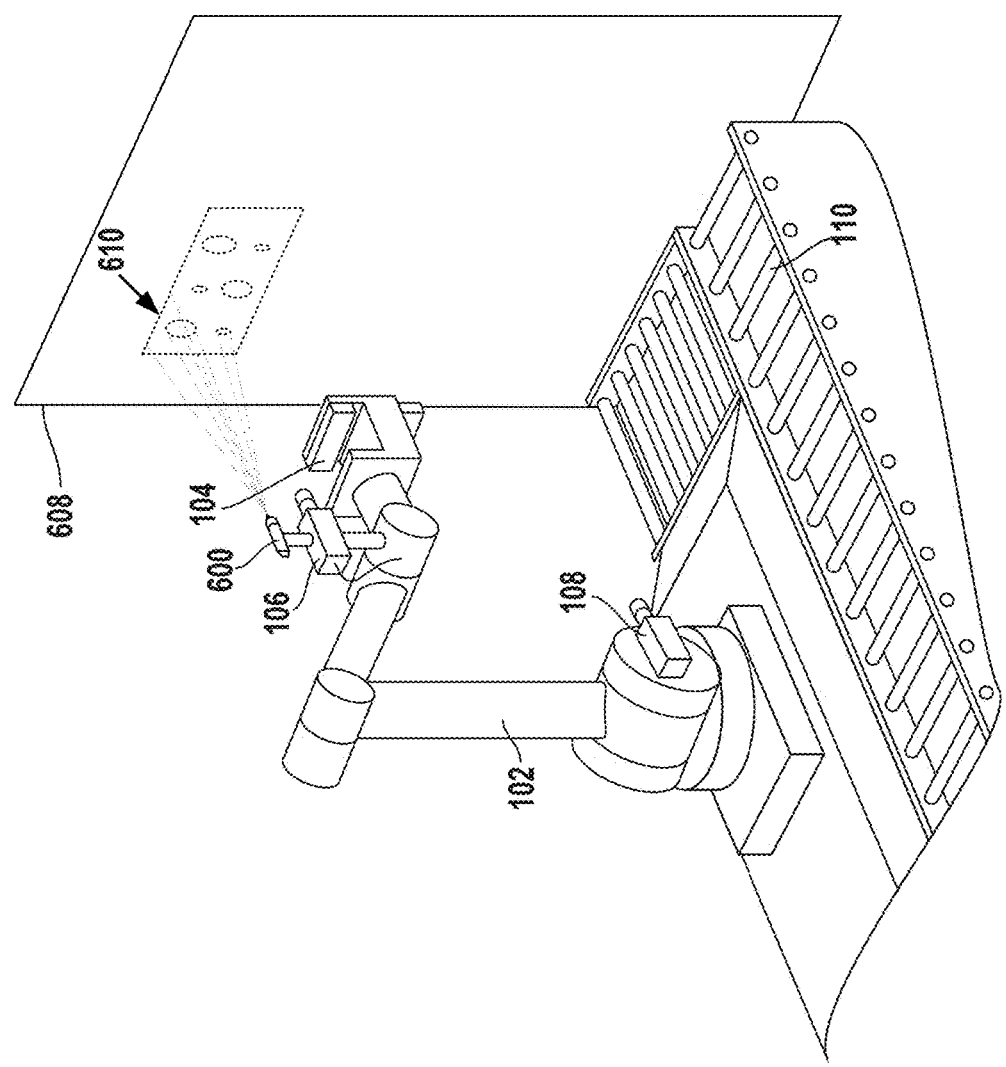
FIG. 6 illustrates example operations being performed, in accordance with at least some implementations described herein.
Figure 6:
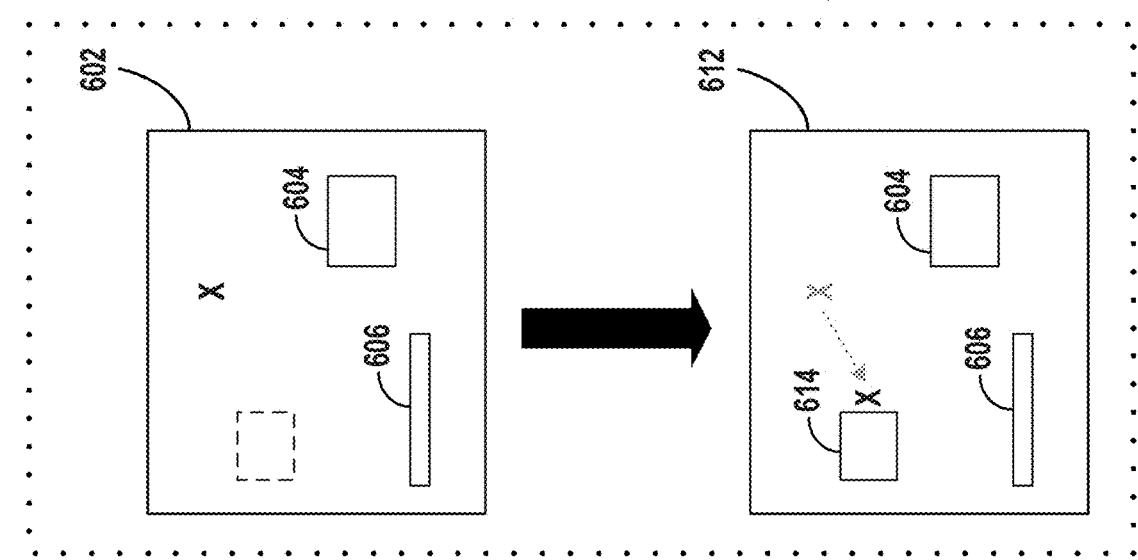

FIG. 6 illustrates example operations of an example method being performed, such the example method of FIG. 3 or the example method of FIG. 5. FIG. 6 includes the robotic arm 102 and holonomic base illustrated in FIGS. 1A, 2A, and 2B, and further includes an applicator 600 mounted on the robotic arm near the gripper 104 and coupled to the sensor 106. In other implementations, the applicator 600 may be coupled at other locations on the robotic arm, holonomic base, or other robotic device. Further, FIG. 6 illustrates a map 602 of the environment of the robotic device, where the robotic device is represented by an X on the map, and the map includes previously-detected landmarks 604 and 606.

In an example scenario, the robotic device may determine that a surface of an object 608 in the environment lacks discernable features to determine a location of the object, to determine a localization of the robotic device, and/or for performing other operations. The robotic device may responsively approach the object 608 and spray a unique pattern 610 on the surface of the object 608 using the applicator 600. At some point later in time, the robotic device (or a different robotic device) can then detect the pattern 610 using the sensor 606 and one or more feature detection algorithms, and responsively generate an updated map 612 that includes a marked location 614 of the object 608, where the object then serves as a landmark for future navigation through the environment and/or for other future operations.

For instance, if the object 608 moves from a first location to a second location, the robotic device may identify the pattern 610 in a sequence of images captured by the robotic device as the object moves. The robotic device may use the identified pattern 610 to detect the movement of the object 608 to the second location. In another instance, if the robotic device leaves the environment for a period of time during which the object 608 is moved to a different location in the environment than where the updated map 612 indicates the object to have been, the robotic device may update the map yet again to remove the object from that previous location and, upon detecting the pattern 610 at the new location in the environment, the robotic device may determine the object 608 to then be at the new location and indicate this on the map. Other examples are possible as well.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system comprising:
    a robotic device;
    an applicator configured to provide a material onto a surface of an object, wherein the material, once provided on the surface, is designed to disappear from the surface within a predetermined period of time;
    one or more optical sensors;
    at least one processor;
    data storage comprising instructions executable by the at least one processor to cause the system to perform operations comprising:
        causing the robotic device to provide, using the applicator, the material in a pattern onto one or more surfaces in a physical environment; and
        based on the material being designed to disappear from the one or more surfaces within the predetermined period of time:

detecting, within the predetermined period of time and using the one or more optical sensors, the pattern on the one or more surfaces, wherein the pattern includes a discernable feature sufficient to determine a first location of the one or more surfaces in the physical environment;

determining, within the predetermined period of time, the discernable feature from the detected pattern on the one or more surfaces, and using, within the predetermined period of time, the discernable feature to determine the first location of the one or more surfaces with respect to a second location of the robotic device in the physical environment.

2. The system of claim 1, wherein the one or more surfaces are one or more surfaces of at least one object, the operations further comprising:

in response to using the discernable feature to determine the first location of the one or more surfaces with respect to the second location of the robotic device in the physical environment, causing the robotic device to manipulate the at least one object.

3. The system of claim 1, wherein the one or more surfaces are one or more surfaces of at least one moving object, and wherein using the discernable feature to determine the first location of the one or more surfaces with respect to the second location of the robotic device in the physical environment comprises using the discernable feature to sense the first location of the at least one moving object with respect to the second location of the robotic device over a period of time as the at least one moving object moves in the physical environment.

4. The system of claim 1, further comprising a projector, wherein detecting, using the one or more optical sensors, the pattern on the one or more surfaces comprises:

using the projector to project light onto the one or more surfaces at substantially a location of the pattern, wherein the projected light includes one or more of ultraviolet (UV) light and infrared (IR) light; and while projecting the light onto the one or more surfaces, detecting, using the one or more optical sensors, the pattern on the one or more surfaces.

5. The system of claim 1, wherein the pattern is unique.

6. The system of claim 1, wherein the material includes one or more of: non-reflective paint, reflective paint, invisible ink, and disappearing ink.

7. The system of claim 1, wherein causing the robotic device to provide, using the applicator, the material in the pattern onto the one or more surfaces in the physical environment comprises causing the robotic device to provide, using the applicator, the material as one or more of a two-dimensional (2D) pattern or a three-dimensional (3D) texture onto the one or more surfaces in the physical environment.

8. The system of claim 1, wherein causing the robotic device to provide, using the applicator, the material in the pattern onto the one or more surfaces in the physical environment comprises causing the robotic device to first provide a primer material onto the one or more surfaces and subsequently provide, using the applicator, the material in the pattern onto the one or more surfaces.

9. A method comprising:

causing a robotic device to provide, using an applicator, a material in a pattern onto one or more surfaces in a physical environment, wherein the material, once provided on the one or more surfaces, is designed to disappear from the one or more surfaces within a predetermined period of time; and based on the material being designed to disappear from the one or more surfaces within the predetermined period of time:

detecting, within the predetermined period of time and using one or more optical sensors, the pattern on the one or more surfaces, wherein the pattern includes a discernable feature sufficient to determine a first location of the one or more surfaces in the physical environment;

determining, within the predetermined period of time, the discernable feature from the detected pattern on the one or more surfaces, and using, within the predetermined period of time, the discernable feature to determine the first location of the one or more surfaces with respect to a second location of the robotic device in the physical environment.

10. The method of claim 9, wherein determining the first location of the one or more surfaces with respect to the second location of the robotic device in the physical environment comprises using a simultaneous localization and mapping (SLAM) process to determine (i) the first location of the one or more surfaces with respect to the second location of the robotic device in the physical environment and (ii) a map of at least a portion of the physical environment.

11. The method of claim 10, wherein the map includes a visual representation of at least the portion of the physical environment, and wherein the map includes one or more of: a topological map of the physical environment and a metric map of the physical environment.

12. The method of claim 9, further comprising:

before causing the robotic device to provide, using the applicator, the material in the pattern onto the one or more surfaces in the physical environment:

engaging in an attempt to extract at least one discernable feature from at least one image of the one or more surfaces, whereby a number of discernable features are extracted; and based on a determination that the number of discernable features that are extracted is below a threshold, determining that the one or more surfaces lack sufficient discernable features to determine the first location of the one or more surfaces in the physical environment, wherein causing the robotic device to provide, using the applicator, the material in the pattern onto the one or more surfaces in the physical environment comprises causing the robotic device to provide, using the applicator, the material in the pattern onto the one or more surfaces in the physical environment in response to determining that the one or more surfaces lack sufficient discernable features to determine the first location of the one or more surfaces in the physical environment.

13. The method of claim 9, further comprising:

before causing the robotic device to provide, using the applicator, the material in the pattern onto the one or more surfaces in the physical environment:

determining a classification for the one or more surfaces, wherein the classification is representative of (i) a type of surface of the one or more surfaces and (ii) a type of texture of the one or more surfaces; and based on the classification, determining at least one type of pattern to be provided by the robotic device onto the one or more surfaces,
wherein causing the robotic device to provide, using the applicator, the material in the pattern onto the one or more surfaces in the physical environment comprises causing the robotic device to provide, using the applicator, the material in the pattern of the at least one type of pattern onto the one or more surfaces in the physical environment.

14. The method of claim 9, further comprising:
before causing the robotic device to provide, using the applicator, the material in the pattern onto the one or more surfaces in the physical environment:
estimating an amount of time to determine the first location of the one or more surfaces with respect to the second location of the robotic device in the physical environment; and
selecting the material from a plurality of materials based on the predetermined period of time of the selected material being within a threshold amount of time from the estimated amount of time.

15. A non-transitory computer-readable medium having stored thereon program instructions that when executed by a computing system that includes at least one processor cause the computing system to perform operations comprising:
causing a robotic device to provide, using an applicator, a material in a pattern onto one or more surfaces in a physical environment, wherein the material, once provided on the one or more surfaces, is designed to disappear from the one or more surfaces within a predetermined period of time; and
based on the material being designed to disappear from the one or more surfaces within the predetermined period of time:
detecting, within the predetermined period of time and using one or more optical sensors, the pattern on the one or more surfaces, wherein the pattern includes a discernable feature sufficient to determine a first location of the one or more surfaces in the physical environment;
determining, within the predetermined period of time, the discernable feature from the detected pattern on the one or more surfaces, and
using, within the predetermined period of time, the discernable feature to determine the first location of the one or more surfaces with respect to a second location of the robotic device in the physical environment.

16. The non-transitory computer-readable medium of claim 15, wherein the one or more surfaces are one or more surfaces of at least one object, the operations further comprising:
in response to using the discernable feature to determine the first location of the one or more surfaces with respect to the second location of the robotic device in the physical environment, causing the robotic device to manipulate the at least one object.

17. The non-transitory computer-readable medium of claim 15, wherein the one or more surfaces are one or more surfaces of at least one moving object, and
wherein using the discernable features to determine the first location of the one or more surfaces with respect to the second location of the robotic device in the physical environment comprises using the discernable feature to sense the first location of the at least one moving object with respect to the second location of the robotic device over a period of time as the at least one moving object moves in the physical environment.

18. The non-transitory computer-readable medium of claim 15, wherein the pattern is unique.

19. The non-transitory computer-readable medium of claim 15, the operations further comprising:
before causing the robotic device to provide, using the applicator, the material in the pattern onto the one or more surfaces in the physical environment:
engaging in an attempt to extract at least one discernable feature from at least one image of the one or more surfaces, whereby a number of discernable features are extracted; and
based on a determination that the number of discernable features that are extracted is below a threshold, determining that the one or more surfaces lack sufficient discernable features to determine the first location of the one or more surfaces in the physical environment,
wherein causing the robotic device to provide, using the applicator, the material in the pattern onto the one or more surfaces in the physical environment comprises causing the robotic device to provide, using the applicator, the material in the pattern onto the one or more surfaces in the physical environment in response to determining that the one or more surfaces lack sufficient discernable features to determine the first location of the one or more surfaces in the physical environment.

20. The non-transitory computer-readable medium of claim 15, further comprising:
before causing the robotic device to provide, using the applicator, the material in the pattern onto the one or more surfaces in the physical environment:
determining a classification for the one or more surfaces, wherein the classification is representative of (i) a type of surface of the one or more surfaces and (ii) a type of texture of the one or more surfaces; and
based on the classification, determining at least one type of pattern to be provided by the robotic device onto the one or more surfaces,
wherein causing the robotic device to provide, using the applicator, the material in the pattern onto the one or more surfaces in the physical environment comprises causing the robotic device to provide, using the applicator, the material in the pattern of the at least one type of pattern onto the one or more surfaces in the physical environment.

* * * * *